Figure 1:
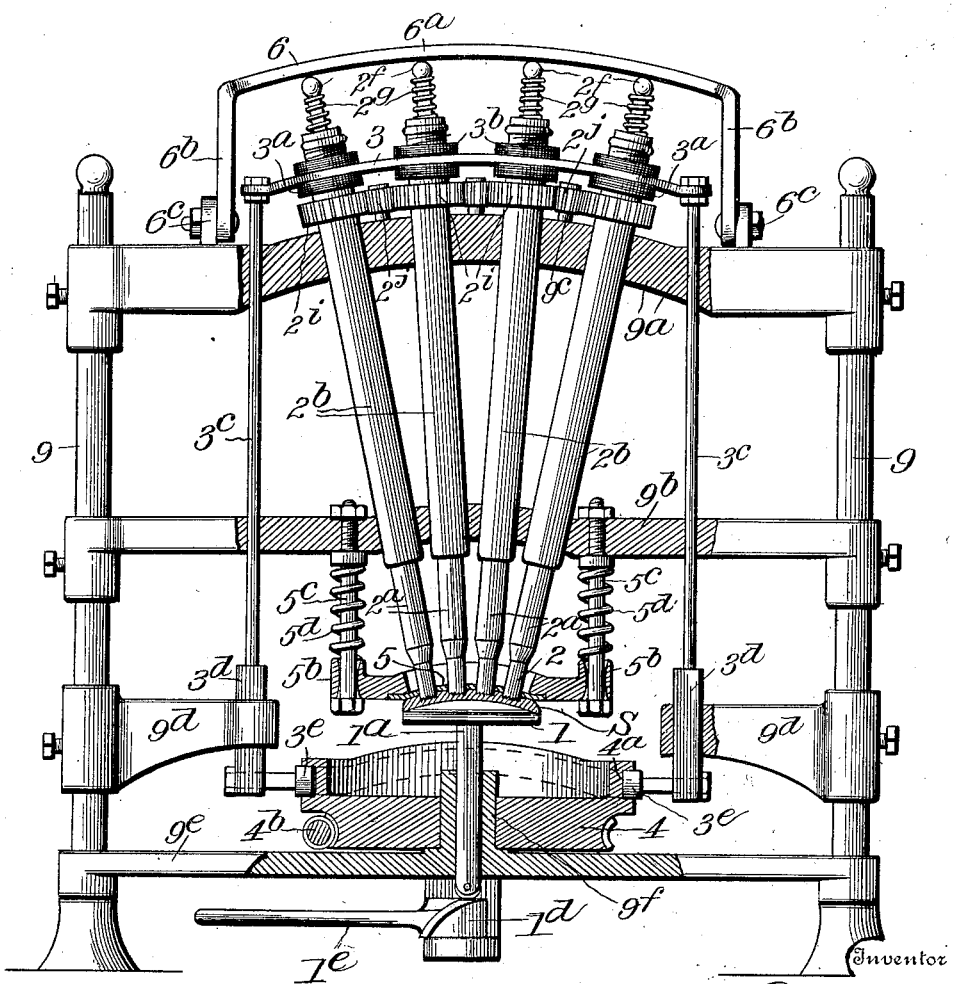

No. 897,187. PATENTED AUG. 25, 1908.
N. BARRY, Jr.
BUTTON BLANK CUTTING MACHINE.
APPLICATION FILED DEC. 3, 1906.

3 SHEETS—SHEET 1.

Witnesses
C. H. Walker.
James R. Mansfield.

Inventor
Nicholas Barry Jr.
By
Alexander & Dowell
Attorneys

No. 897,187. PATENTED AUG. 25, 1908.
N. BARRY, Jr.
BUTTON BLANK CUTTING MACHINE.
APPLICATION FILED DEC. 3, 1906.
3 SHEETS—SHEET 2.
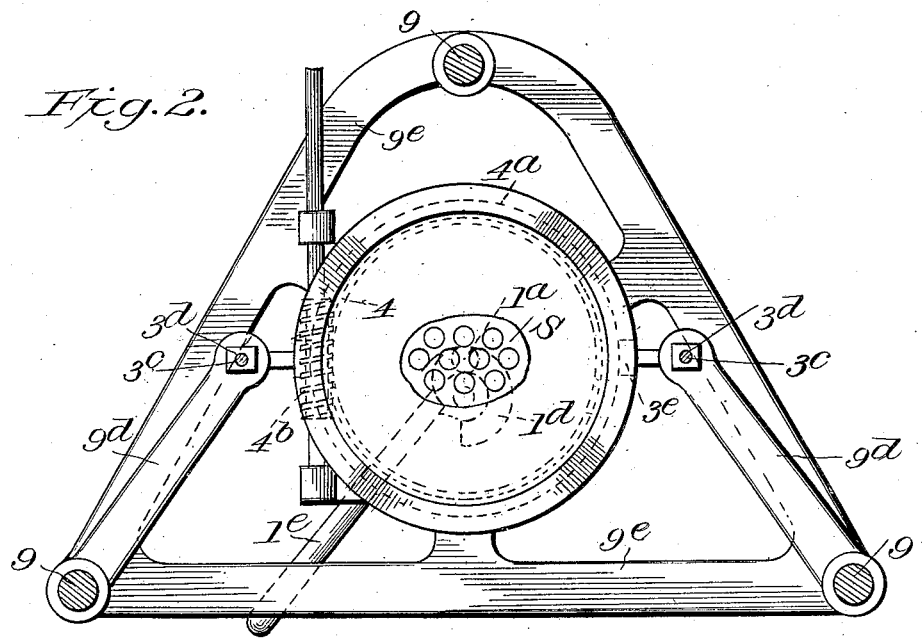
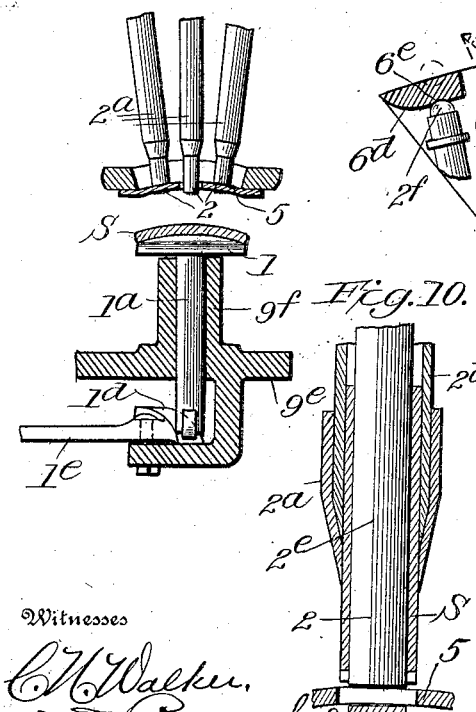
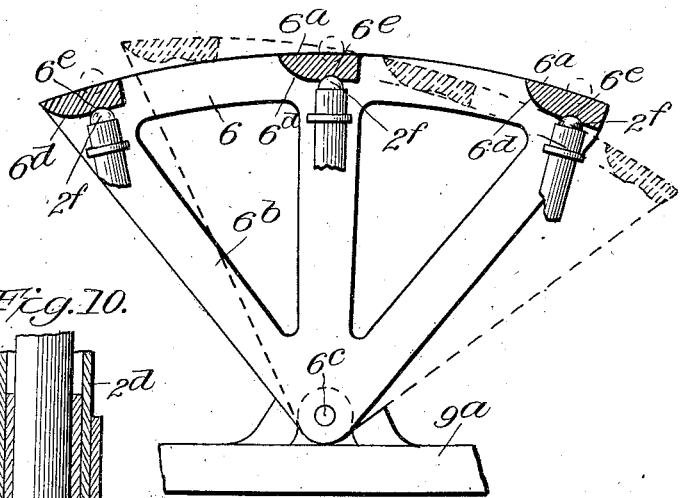

No. 897,187. PATENTED AUG. 25, 1908.
N. BARRY, Jr.
BUTTON BLANK CUTTING MACHINE.
APPLICATION FILED DEC. 3, 1906.
3 SHEETS—SHEET 3.
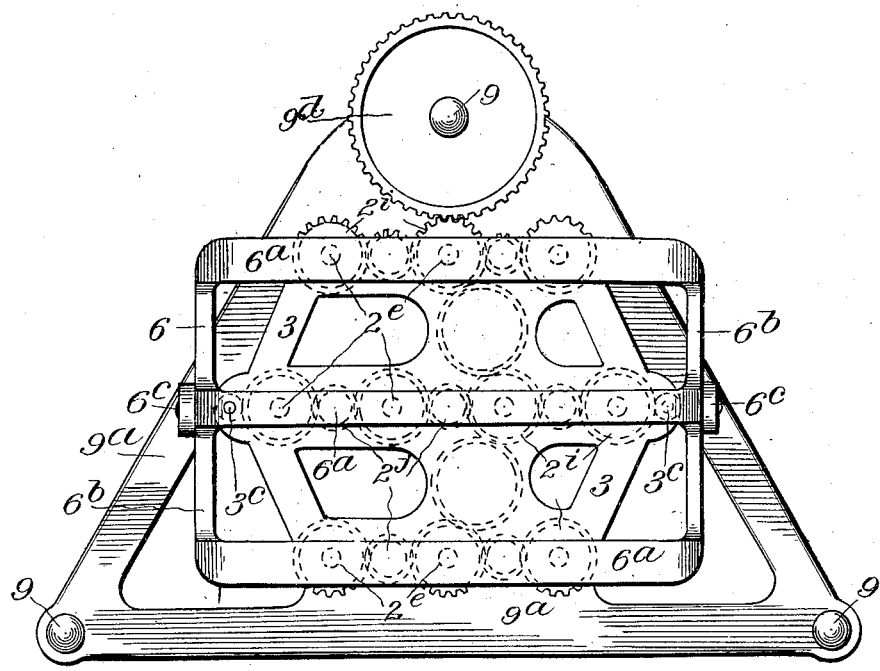
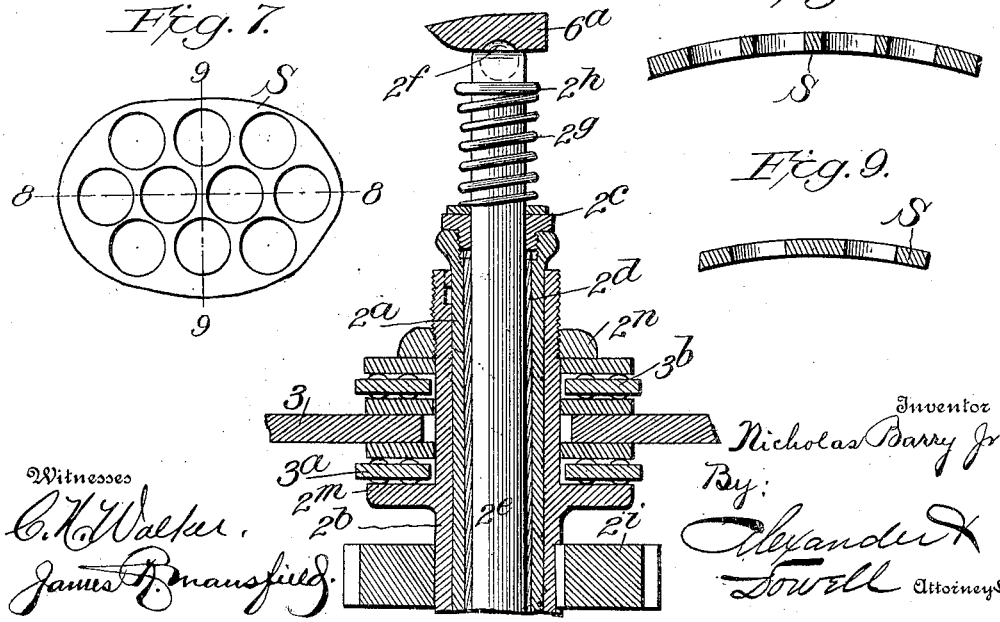

UNITED STATES PATENT OFFICE.

NICHOLAS BARRY, JR., OF MUSCATINE, IOWA.

BUTTON-BLANK-CUTTING MACHINE.

No. 897,187.   Specification of Letters Patent.   Patented Aug. 25, 1908.

Application filed December 3, 1906. Serial No. 346,134.

*To all whom it may concern:*

Be it known that I, NICHOLAS BARRY, Jr., of Muscatine, in the county of Muscatine and State of Iowa, have invented certain new and useful Improvements in Button-Blank-Cutting Machines; and I hereby declare that the following is a full, clear, and exact description thereof, reference being had to the accompanying drawings, which form part of this specification.

This invention is an improvement in button making and especially relates to the manufacture of "pearl" buttons from the mussel shells found in the Mississippi river and its tributaries; and the objects of the invention are to lessen the cost of production of the button blanks; to increase the product heretofore obtainable from such shells; and to expedite the making of the blanks by automatically cutting a number of blanks simultaneously from each shell, so that if desired all the blanks can be cut from a shell at one operation instead of cutting them singly by successive operations as is necessary by the present known methods of, and machines for cutting such shells.

Additional objects are to dispense with manual handling of the shells after the initial feeding thereof to the machine, until all the blanks are cut therefrom; and to enable parts of the shell heretofore absolutely wasted to be utilized for blanks.

Other subsidiary objects and advantages of the invention will be hereinafter mentioned.

The invention consists in the novel means for cutting blanks from a shell at each operation of the machine, and will be clearly understood from the following description of the machine illustrated in the drawings, which is a practical, and the at present preferred, embodiment of the invention, but is also illustrative and not restrictive thereof,—and I therefore refer to the claims following the description of such machine for concise summaries of the invention and substantial features thereof for which I desire protection.

In the drawings—Figure 1 is partly a side elevation, and partly a sectional view, of the complete machine. Fig. 2 is a transverse section taken just above the shell in Fig. 1, looking down. Fig. 3 is a detail sectional view of the ejector retainer head. Fig. 4 is a detail transverse sectional view through the shell-support and cutters. Fig. 5 is a top plan view of the machine. Fig. 6 is an enlarged detail sectional view through the upper part of one of the blank cutting devices. Fig. 7 is a plan view of one of the shells showing the method of cutting; and Figs. 8 and 9 are sectional views of the shell on lines 8—8 and 9—9 respectively, Fig. 7. Fig. 10 is a detail sectional view of the cutter and blank ejector.

In the embodiment of the invention illustrated in the drawings, I employ a shell-support 1, which is mounted on the upper end of a vertically movable shaft $1^a$, resting at bottom upon a cam $1^d$, provided with a lever $1^e$ by which it can be turned by the hand or foot of the operator so as to raise or lower the shell-support 1. This support is shaped to substantially conform to the inner concave surface of the shell S, which is preferably previously ground to concavo-convex form (as illustrated in Figs. 7, 8, 9). As all the shells to be treated are preferably previously prepared by running them through such a grinding machine, they will all have the same internal contour and thus will all fit alike upon the holder 1, although they may be of different superficial area. The shells S, as shown in Figs. 7, 8, 9, are ground both back and front so that they are reduced to substantially uniform thickness, and preferably to a parti-spherical form, as described in my application above referred to.

Arranged above the shell-support 1, is a nest of blank cutters comprising tubular saws and their holding and operating devices; these are arranged on lines approximately radiating from the center of the shell-holder 1,—so that each cutter will be perpendicular to the convex or upper surface of the shell when it operates thereon; this arrangement enables me to bring the saws close together at their lower or cutting ends; while their upper ends are divergent and spaced apart sufficiently to enable me to provide suitable means, preferably gearing, for rotating all the saws on their individual axes and preferably in the same direction. As shown there are ten such blank cutting devices above the shell-support, their lower ends converging toward the support, and positioned so that the cutters can be simultaneously caused to operate upon a shell on the support, and thus—if the shell be sufficiently large—ten blanks can be cut simultaneously therefrom, as indicated in Figs. 2 and 7, and thus practically the entire shell utilized at one operation,—the blanks being cut simultaneously therefrom and the remaining portion of the shell being worthless, and requiring no re-positioning to enable any other blank to be cut therefrom—thereby effecting the greatest economy in operation, as ordinarily ten different cutting operations would have to be performed to cut ten blanks from a single shell, and between each operation the shell has to be manually re-positioned so that the cutter can properly operate thereon.

Each blank cutting device, (see Figs. 1, 2, 6 and 10) as shown, consists of a tubular saw 2, which may be of the usual construction and fitted in the lower end of a saw-holding and clamping tube $2^a$ which is in turn mounted in a rotatable tubular carrier $2^b$ which is slidably and rotatably mounted in bearings in upper and lower transverse plates $9^a$, $9^b$, fastened to the uprights 9 of the main frame at suitable distances apart and above the shell-support 1, as shown in Fig. 1. The saw-holder $2^a$ extends above the upper end of carrier $2^b$, and has its upper end internally threaded for the engagement of a tubular nut $2^c$ by which the saw-clamping sleeve $2^d$ can be adjusted to secure the saw in the holder, as customarily done.

Within the saw-holder and saw is arranged an ejector-rod $2^e$, the lower end of which lies close to the teeth of the saw, as in Fig. 10—while its upper end extends above the holder $2^a$, and is provided with a ball-bearing $2^f$, which normally underlies a stop-bar $6^a$ by which the ejector-rod is held down when the saw rises. A spring $2^g$ is interposed between the flange $2^h$ on the upper end of the ejector-rod and the nut $2^c$ as shown, said spring normally holding the rod up against the stop-bar $6^a$. The several saws can be rotated in unison in any desired manner. As shown their carriers $2^b$ are rotatable, as well as longitudinally movable, and the saw-holders and saws rotate with the carriers. Each carrier $2^b$ is provided with a pinion $2^i$, above the plate $9^b$, which pinions mesh with intermediates $2^j$ journaled on studs $9^c$ on plate $9^b$, so that all the cutters will rotate uniformly and in the same direction. The cutters may be driven from a master-gear $9^d$ as indicated in Fig. 5, or in any other suitable manner, said gear $9^d$ being driven by power in any preferred manner.

The cutting devices are preferably arranged in three rows as shown in Fig. 5, four being in the center row, and three in the two outer rows, the rows being staggered. The exact arrangement indicated is not essential; the main requisite being that the cutters will be so arranged that the several saws will operate close together, and as many as possible on the shell at the same time, so that there will be no waste of the shell. The saws should be so arranged that they will be substantially perpendicular to the shell on which they operate; and as the shell are concavo-convex, and the cutters operate at the convex side of the shell, it necessarily follows that the various cutters can be arranged on divergent or radial lines as shown and described; and each cutting device has a limited movement directly to and from the shell. This divergent arrangement of the carriers enables me to intergear them at a convenient distance above the shell support, and also to move each saw directly to and from its work by reciprocating the carriers $2^b$ in their bearings in plates $9^a$, $9^b$.

A practical and convenient means for reciprocating the saws to and from the work, is illustrated in the drawings, and comprises what I shall term a pusher-plate or grating 3, (see Figs. 1 and 6) which overlies the plate $9^b$ and is provided with holes for the passage of the upper ends of the several carriers $2^b$, (said pusher-plate 3 being preferably arranged above plate $9^b$, and the gears $2^i$.) These openings are slightly larger in diameter than the carriers $2^b$, so that the carriers will not bind in the openings as the pusher-plate rises and falls.

In order to cause the carriers to rise and fall with the pusher-plate the carriers have flanges or nuts above and below the pusher-plate, and preferably as shown in Fig. 6, ball-bearings $3^a$ are interposed between the under side of the pusher-plate and flanges $2^m$ on the guides $2^b$, and ball-bearings $3^b$ are interposed between the upper side of the pusher-plate and flange-nuts $2^n$ screwed onto the upper ends of the carriers $2^b$, as shown. Thus the carriers are perfectly free to rotate relatively to the pusher-plate, but can be raised or lowered thereby and therewith.

The pusher-plate may be operated to raise and lower the cutting devices in proper time by any suitable mechanism. One practical form is shown in Fig. 1, in which vertical rods $3^c$ are connected at their upper ends to the pusher-plate, at opposite points, and their lower ends are connected to slides $3^d$, $3^d$, guided in brackets $9^d$ attached to the uprights 9 of the frame, said slides having friction-rollers $3^e$ on their lower ends engaging a race-cam-groove $4^a$ formed on or attached to the periphery of a worm-gear 4 which is journaled on an axial stud $9^f$ attached to the bottom plate $9^e$ of the main frame, said stud also forming a guide for the shaft $1^a$, supporting the shell-holder 1, as shown. The gear 4 can be operated by a worm $4^b$, on a countershaft which can be driven by belting or gearing of any suitable kind from any convenient driven shaft. At each rotation of the gear 4 the cutters will be raised and lowered, and the cams are so proportioned that the cutters will be lowered very gradually toward the shell and retracted quickly.

The lower ends of the tubular saws pass through a preferably thin plate 5, see Figs. 1, 4, and 10, which is supported in an annulus 5ª provided with lugs 5ᵇ, which are loosely transfixed by bolts 5ᶜ, suspended from the plate 9ª, as shown in Fig. 1, and springs 5ᵈ are interposed between the eyes 5ᵉ and the plate 9ª to hold the plate 5, in its lowermost position. Preferably this plate is curved substantially like the upper surface of the shell-holder 1, and is so located that when the holder 1, with the shell laid thereon, is raised to its uppermost position, the plate 5 will hold the shell upon the support until the saws descend thereon. The support 1 may be faced with Babbitt metal, or any other suitable material, which will not injure the saws when they cut through the shell and which can be readily renewed. The ejector-rods and the saw holders are normally held down in proper position within the carriers 2ᵇ by means of a retainer 6, which may extend over the upper ends of all the cutting devices, but I preferably make it in the form of a grating provided with longitudinal retainer-bars 6ª, one for each row of cutting devices, as indicated more particularly in Figs. 3 and 5. These bars are supported on rocking segments 6ᵇ which are pivoted at 6ᶜ on the upper plate 9ᵇ, and by rocking these segments 6ᵇ the bars 6ª can be swung to one side of the upper ends of the ejector-rods, as indicated in dotted lines in Fig. 3, in which position the ejector-rods and the saw-holders 2ª can be removed from the carriers 2ᵇ, by withdrawing them longitudinally therefrom; thus the saws can be easily removed and sharpened if desired, and can be readily replaced in the carriers; when replaced, by simply swinging the segment or bar 6ª, back to the position indicated in full lines in Fig. 3, the ejector-rods and saw-holders will be pushed down and held in proper position. The retainer bars 6ª may be rounded on one edge as indicated at 6ᵈ, to facilitate their movement over the ends of the ejector-rods, and they may also be provided with concavities as at 6ᵉ for the engagement of the ball-bearings on the upper end of the ejector-rods. The retainers will be held in place by the pressure of the ejector-rods thereagainst; but may be fastened in place by tightening the nuts on the pivot bolts 6ᶜ.

Operation. The shells S are preferably prepared by grinding them to the concavo-convex form indicated in the drawings. The operator than takes such a shell, and after lowering the shell-support 1 to the position indicated in Fig. 4, places the shell thereon, the convex side uppermost. The holder is then raised to the position shown in Fig. 1, bringing the shell up against the plate 5, and then the cam begins to lower the pusher-plate 3, which moves all of the rotating saws downward and against the upper convex side of the shell. Each saw moves perpendicularly to that portion of the surface of the shell upon which it operates, and all the saws move in unison and are rotated in unison; all of the saws under which the shell extends will cut a blank therefrom, and if the shell be large enough as many as ten blanks can be cut therefrom by the machine illustrated in the drawings,—if the shell be small, a less number of blanks would be cut by such a machine, but all of the blanks that can be produced from the shell will be cut therefrom at one operation. After the cutting operation is effected and the saws retracted, and as the saws rise the cut blanks are ejected therefrom by ejector-rods 2ᵉ. The shell-support is lowered and the operator removes the cut shell and places an uncut one on the support.

Obviously the number of saws may be increased or diminished according to the desired capacity of the machine and the size of the blanks to be cut; also various sizes of blanks may be simultaneously cut from a shell by using different sized saws in the machine. By reason of the concavity of the shell, its close fit upon the holder and the simultaneous and direct action of the several saws thereupon, the blanks can be cut accurately and rapidly. It is preferable to have the shells ground to a substantially uniform thickness and contour before they are placed upon the shell-support in order that the cutters may operate simultaneously and most efficiently thereupon, as I do not think it desirable to attempt to cut unprepared shells in this manner, although the invention might be adapted for such purpose. The saving of time effected by simultaneously cutting a number of blanks at one operation as compared with cutting a like number of blanks at separate operations is obvious.

The only manual operations required in using the machine, shown in the drawings, is the placing of the uncut shell on the support and removing the cut shell therefrom; and the raising and lowering of the shell-support by means of the controlling lever, which can be operated by the foot. By such a machine one operator is able to do the work of ten cutters, and more accurately than the same amount of work could be performed by the single blank hand-operated machines. And by reason of the prior grinding of the shells to the form indicated I obtain a much larger yield of buttons from the shells than has heretofore been possible, because I utilize the butt and hinge portion of the shell, which are unworkable by the present means and methods of cutting.

When the retainers 6ª are thrown back to the position shown in dotted lines in Fig. 3, the saw-holders or spindles can be removed from the carriers 2ᵇ and the saws taken out for redressing or sharpening, and can be replaced, or substituted with new ones, or adjusted in the carriers, so that the several saws will cut properly.

Having described my invention what I claim as new and desire to secure by Letters Patent is:—

1. In a button-blank cutting machine, the combination of a convex work-support, a plurality of tubular blank cutters opposite the support and arranged on diverging lines, and means for causing the cutters to operate upon the work on the support.

2. In a button-blank cutting machine, the combination of a shell-support, a plurality of rotatable tubular cutters opposite said support arranged on diverging lines, a pusher-plate adapted to loosely engage the cutters, and means for raising and lowering said pusher-plate to move the cutters simultaneously to and from the shell-support.

3. In a button-blank cutting machine, the combination of a shell-support, a plurality of tubular blank cutters opposite the shell-support, means for rotating said blank cutters on their individual axes, and means for causing said cutters to simultaneously operate upon the shell to cut a plurality of blanks therefrom; with ejector-rods in said cutters, a retainer-plate or bars arranged over the upper ends of the ejector-rods mounted on rocking supports.

4. In a button-blank cutting machine, the combination of a shell-support, a plurality of rotatable tubular cutters opposite said support and arranged on divergent lines, a pusher-plate adapted to loosely engage the cutters, and means for raising and lowering said pusher-plate to move the cutters simultaneously to and from the shell-support; with ejector-rods in said cutters, and a curved retainer-plate arranged over the upper ends of the ejector-rods and mounted on rocking supports.

In testimony that I claim the foregoing as my own, I affix my signature in presence of two witnesses.

NICHOLAS BARRY, JR.

Witnesses:
WILLIAM R. JAYNE,
ARTHUR E. DOWELL.